US006842723B2

(12) United States Patent
Alicherry et al.

(10) Patent No.: US 6,842,723 B2
(45) Date of Patent: Jan. 11, 2005

(54) JOINT PLACEMENT AND CONFIGURATION OF CROSS-CONNECTS AND ADD-DROP MULTIPLEXERS IN AN OPTICAL MESH NETWORK

(75) Inventors: Mansoor Ali Khan Alicherry, Scotch Plains, NJ (US); Harsha Nagesh, New Providence, NJ (US); Chitra Phadke, Basking Ridge, NJ (US); Viswanath Poosala, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 15 days.

(21) Appl. No.: 10/393,306

(22) Filed: Mar. 20, 2003

(65) Prior Publication Data

US 2004/0186696 A1 Sep. 23, 2004

(51) Int. Cl.⁷ .......................... G06F 17/50; H04I 14/00
(52) U.S. Cl. ............................................ 703/2; 370/351
(58) Field of Search ...................... 703/2, 13; 370/351, 370/241; 709/238

(56) References Cited

PUBLICATIONS

Grover et al, US patent application Publication No. US 2002/0071392 A1, Pub. Date Jun. 13, 2002.*
Grover et al, US patent application publication No. US 2003/0016623 A1, Pub. Date Jan. 23, 2003.*
Mukherjee, B., Some Principles for Designing a Wide–Area WDM Optical Network, IEEE/ACM Transactions on Networking, vol. 4, No., IEEE, pp. 684–696, Oct. 1996.
Doshi, Bharat T., et al., "Optical Network Design and Restoration", Bell Labs Technical Journal, pp. 58–84, Jan.–Mar., 1999.
Davis, Drew R., et al., "SPIDER: A Simple and Flexible Tool for Design for Provisioning of Protected Lightpaths in Optical Networks", Bell Labs Technical Journal, pp. 82–97, Jan.–Jun., 2001.

* cited by examiner

*Primary Examiner*—Thai Phan (57) ABSTRACT

Network design techniques are disclosed for optimally placing OXCs and OADMs in an optical mesh network to minimize network cost by using cheaper OADMs wherever possible and only using more expensive OXCs where required. In one aspect, the techniques are provided for determining the optimal configuration of each OXC in terms of each OXC's switch size and port configuration. In another aspect, the present invention provides network analysis transformation techniques which enable Dijkstra's shortest path algorithm to account for the degree of each network node and determine optimal placement of the OXCs and OADMs.

23 Claims, 9 Drawing Sheets

JOINT PLACEMENT AND CONFIGURATION OF CROSS-CONNECTS AND ADD-DROP MULTIPLEXERS IN AN OPTICAL MESH NETWORK

FIELD OF THE INVENTION

The present invention relates to the design of optical fiber based signal transmission networks. More particularly, the present invention relates to systems and methods for determining advantageous placement and configuration of optical cross-connects and optical add-drop multiplexers on such networks.

BACKGROUND OF THE INVENTION

The design of optimized optical telecommunications networks is a complex process of immense importance due to the high cost and constant evolution of system hardware and the impact of such design on localized and overall network performance. Key considerations in network design include the often conflicting needs to provide robust performance while simultaneously reducing costs of capital, operations and maintenance. Innovative optical network components, each with its own specific costs, capabilities and compatibilities, continue to become available for network implementation. Accordingly, a voluminous array of options must be considered in order to select components having optimal configurations for use at particular positions within a network, taking ongoing system demand changes into account. Among the multifaceted considerations to be addressed in system design are, for example, cost optimization, selection of equipment from a given subset of currently available components, the need to exploit the existing configurations of currently installed networks, and the need for least-cost routing of traffic that is entitled to varying levels of failure protection. Complex optimization systems that take into account all of these factors and others that may be applicable, are needed to aid network planners and service providers alike to design cheaper networks with the right equipment and network topology.

Core optical telecommunication networks commonly are nationwide systems. Sometimes such systems span entire continents. They mainly comprise two classes of network elements, namely, transmission and switching equipment. Transmission equipment comprises those elements that take care of the transport functionality of multiple wavelength light paths using dense wavelength division multiplexing (DWDM) transmission equipment. DWDM systems, also known as optical line systems (OLSs), comprise end-terminals where single wavelength optical signals are both regenerated upon exiting the OLS, and multiplexed into a single wavelength division multiplexed (WDM) signal upon entering the OLS. Hence the OLS facilitates the combined transmission of a plurality of telecommunication signals that are wavelength division multiplexed. Optical amplifiers are used to reamplify these OLS signals at periodic distances. After an optical signal has traversed a suitably long distance on a given optical fiber and has incurred a predetermined threshold attenuation, it is regenerated by first demultiplexing the signal into single wavelength signals, which then are reamplified. OLSs then feed the regenerated demultiplexed signals into optical cross-connects (OXCs) which switch the single wavelength traffic from a given input port to a desired output port that further feeds the optical signal into a wavelength division multiplexed OLS. Then the signal is combined with other signals into a WDM signal for further transmission toward its destination. Traffic demands are essentially fed on an appropriate pathway through both the core optical network and an underlying metro synchronous optical network (SONET), synchronous digital hierarchy (SDH) or Internet protocol (IP) network.

Optical add-drop multiplexers (OADMs) are a class of network components that can add or drop traffic when placed on an OLS. However, in contrast to OXCs, OADMs cannot perform switching. Thus, point to point traffic signals in a mesh network can either originate at an OADM or at a switching node containing an OXC. The introduction of OADMs thus necessitates determination of the optimal placement of OADMs and OXCs in a network.

Core optical networks are evolving towards a mesh architecture that supports multiple service level agreements (SLAs), including service that is entitled to failure protection and service that is not so protected. Much work has previously been done in mesh network design to address issues of routing traffic demands in terms of multiple wavelength light paths with varying failure protection schemes. Systems for network design and restoration of failed service have been presented, for example, to take care of 100% traffic restoration for a single point of failure in the network. See, for example, Optical Network Design and Restoration, Bharath T. Doshi et al, Bell Labs Technical Journal, Jan.–Mar, (4)1, 1999, which is hereby incorporated herein by reference in its entirety.

Core optical network design has also been extensively addressed in the literature. See, for example, SPIDER: A Simple and Flexible Tool for Design and Provisioning of Protected Lightpaths in Optical Networks, R. Drew Davis et al., Bell Labs Technical Journal, January–June, 2001 which is hereby incorporated herein by reference in its entirety. The SPIDER article describes an iterative system for routing traffic demands. Demands are routed on a least cost path, and an least cost topology is discovered once all the demands are routed in a given order. Each demand is then unrouted and re-routed until the cost of the network cannot be further reduced. This iterative heuristic system is used in routing demands with dedicated service failure protection, and in routing demands with no protection. Prior work on optical network design, routing, wavelength assignment and a general overview of optical networks is further described, for example, in Multi-wavelength Optical Networks: A Layered Approach, T. E. Stern et al, Addison-Wesley, (Reading, Mass. 1999), and Some Principles for Designing a Wide-Area Optical Network. B. Mukherjee et al, IEEE Conference on Computer Communication (INFOCOM 94), June, 1994 both of which are hereby incorporated herein by reference in their entirety.

All of these known systems, however, assume the presence of an OXC at all nodes in the network. Given the overlapping and varying capabilities and costs of OADMs and OXCs, there is a need for a system to determine the optimal placement of OADMs and OXCs in a mesh network satisfying multiple service restoration schemes, only some of which may be entitled to failure protection. In addition, there is a need for systems that are capable of determining the optimal configuration and size of OXCs across such a mesh network. A key motivation for addressing these needs is the fact that OADMs are significantly less expensive than OXCs, and accordingly it is preferable to place as many OADMs as possible in a given mesh network.

SUMMARY OF THE INVENTION

The present invention provides network graph transformation techniques for optimally placing OXCs and OADMs in an optical mesh network to minimize network cost by using cheaper OADMs wherever possible and only using more expensive OXCs where required. In one aspect, the present invention provides techniques for determining the optimal configuration of each OXC in terms of each OXC's switch size and port configuration. In another aspect, the present invention provides network analysis transformation techniques which enable Dijkstra's shortest path algorithm to account for the degree of each network node and determine optimal placement of the OXCs and OADMs.

One transformation technique in accordance with the present invention first considers all the edges, or light paths, that are incident, or incoming, on a network node. A pseudo-node is created for each of the edges incident on this node. Each of the edges that were all incident on the original node are connected, one each, to each of the newly constructed pseudo-nodes. At this point, each edge that was incident on the original node is now incident on just one of the newly created pseudo-nodes. Next, all of the edges that were outgoing from the original node to various other nodes are considered. For each such outgoing edge, a pseudo-node is created. For each outgoing edge from the original node to a different destination one of the pseudo-nodes is connected with the same destination node as in the original network graph.

At this point, the transformed graph has as many pseudo-nodes as the incoming edges on the original node plus as many pseudo-nodes as the outgoing edges from the original node. The edges originally incident on the single node are now each individually incident, one each, on the pseudo-nodes. Similarly, the edges originally outgoing from the single node to different destination nodes now originate, one each, from the pseudo-nodes and connect to their destination nodes as in the original graph. Finally, from each of the pseudo-nodes created for each incident link on the node, add a pseudo-edge to every pseudo-node that was created in lieu of each of the outgoing edges from the node. This technique is then repeated for each node of the network.

A more complete understanding of the present invention, as well as further features and advantages of the invention, will be apparent from the following Detailed Description and the accompanying drawings.

DETAILED DESCRIPTION

Telecommunication network design may be considered to involve a defined quantity (V) of nodes interconnected by optical fibers, where traffic can either originate or terminate. The set of V nodes can be envisioned as being connected in pairs, forming a total quantity (E) of edges in the network. The edges define the right of ways where OLSs and OADMs in defined configurations can potentially be placed to carry optical signals between the two nodes that each of them connect together. In operation of the network, a succession (T) of traffic demands (t) are specified between any two given nodes in the network. Each traffic demand t could either be unprotected traffic, or traffic entitled to dedicated failure protection. Unprotected traffic cannot tolerate a network failure impacting a node between its source and destination without signal interruption. Traffic having dedicated failure protection can be subjected to a network failure without any interruption of service. The network architecture for such failure protection consists of primary and backup paths for the protected traffic demand, so that traffic flowing on the primary path is switched onto the backup path upon such a network failure.

Development of a system for design of optimal mesh networks using the framework described above begins with (1) derivation of a least cost topology for the network consisting of an optimized subset of the given potential right of ways, and (2) definition of the appropriate equipment components to be placed at each node in order to operate the network. Such development further entails definition of the paths to be taken by each traffic demand in the final network. The system for network design need not consider configuration of the equipment components that are placed on the right of ways in between the nodes, because optimally configuring the node equipment is independent of the configuration of equipment components placed on the right of ways.

The appropriate equipment component for a given node can either be an OXC of a given switch size and port count, or an OADM with a given number of channels. Switching occurs in OXCs but not in OADMs. The system for design of optimal networks has to determine whether a given node is most efficiently served by an OXC or an OADM, and then must further define the optimal configuration for the chosen equipment component in either case. Such selection and configuration decisions require a clear understanding of the functionalities of OXCs and OADMs.

Figure 1:
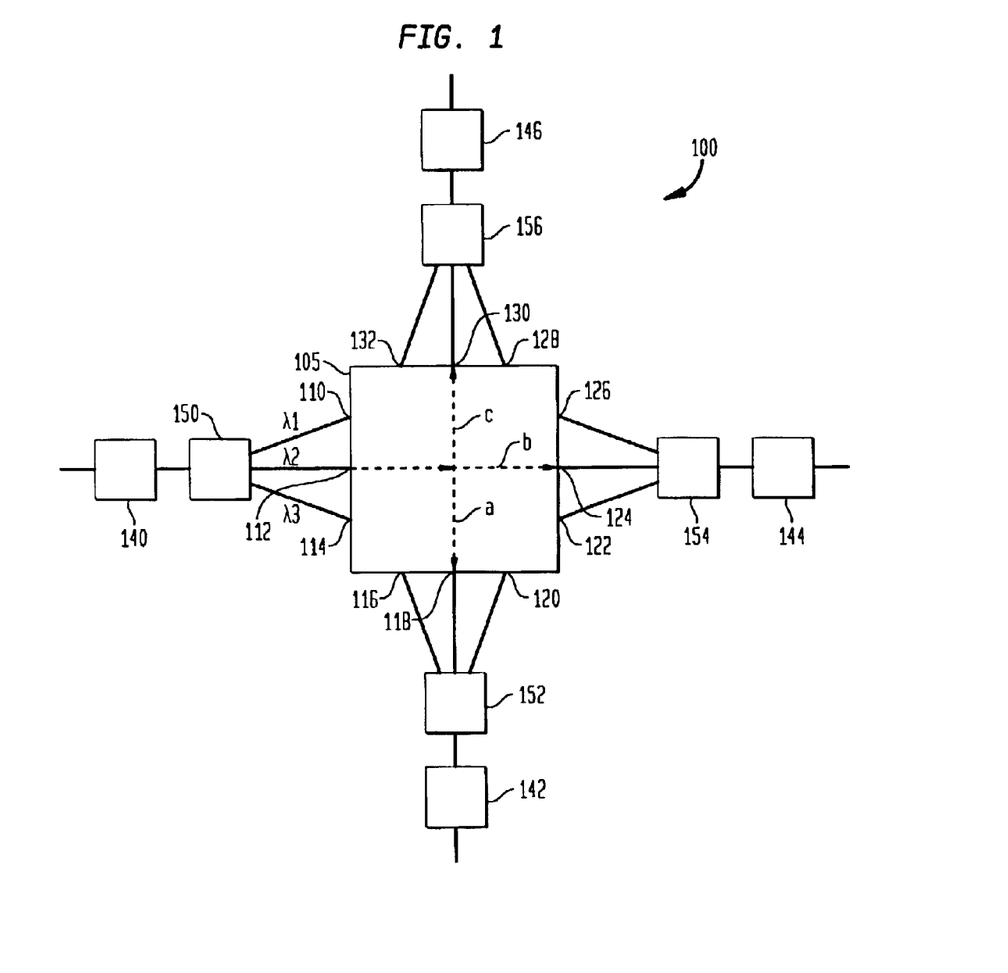
FIG. 1 illustrates an optical cross connect (OCX) device in accordance with the present invention.

FIG. 1 schematically illustrates an OXC node 100. OXC node 100 is a switching system element for wavelength division multiplexed light paths. OXC node 100 includes twelve mono-wavelength signal ports 110, 112, 114, 116, 118, 120, 122, 124, 126, 128, 130, and 132. In operation, all of the ports 110–132 operate both as inputs to and outputs from the OXC, thus carrying bidirectional signals. FIG. 1 shows OLSs 140, 142, and 144 connected to the OXC component 105. A local terminal 146 is connected to the OXC component 105 and is provided to facilitate origination and termination of local traffic. Each of the OLSs 140, 142, and 144, and local terminal 146, carries bi-directional DWDM signals. At the multiplexer-demultiplexers 150, 152, 154 and 156 where the OLSs 140–144 and local terminal 146 are terminated at the OXC 105, DWDM signals directed toward OXC 105 are demultiplexed.

Each demultiplexed mono-wavelength signal is then fed as an input to one of the mono-wavelength signal ports 110–132 of the OXC 105. For example, OLS 140 shows a DWDM signal that is demultiplexed at multiplexer-demultiplexer 150 into mono-wavelength signals $\lambda_1$, $\lambda_2$, and $\lambda_3$ that respectively are then directed into OXC 105 via mono-wavelength signal ports 110, 112 and 114. These mono-wavelength signals are then switched to the desired mono-wavelength port 110–132 by setting up the corresponding cross-connect. In this regard FIG. 1 schematically illustrates the path of an exemplary input signal from OLS 140 through mono-wavelength port 112 operating at $\lambda_2$, which can be rerouted via OLS 142 or 144, or local terminal 146, by pathway a, b, or c respectively, assuming that signal ports 118, 124 and 130 also are operating at $\lambda_2$. A great multiplicity of traffic demands may be routed through the OXC node 100, and the pathways illustrated in FIG. 1 and described are merely representative of the OLSs and cross-connections that may be provided in a given OXC.

Several types of OXCs based on different types of switching mesh network technology are commercially available. The most common forms of OXCs are those using electronic switching backplanes and those using optical switching backplanes. OXCs that use optical switching backplanes are commercially available from Lucent Technologies under the trade name LambdaRouter™. In general, any type of OXC may be used in practicing the present invention. More particularly, the technology used in the chosen design of an OXC does not have any impact on implementation of the systems as discussed below, according to the invention. The key feature of an OXC as implemented in the methods and systems according to the present invention is its capability to switch wavelength division multiplexed lightpaths on a wavelength by wavelength basis from any input port to any output port.

Figure 2:
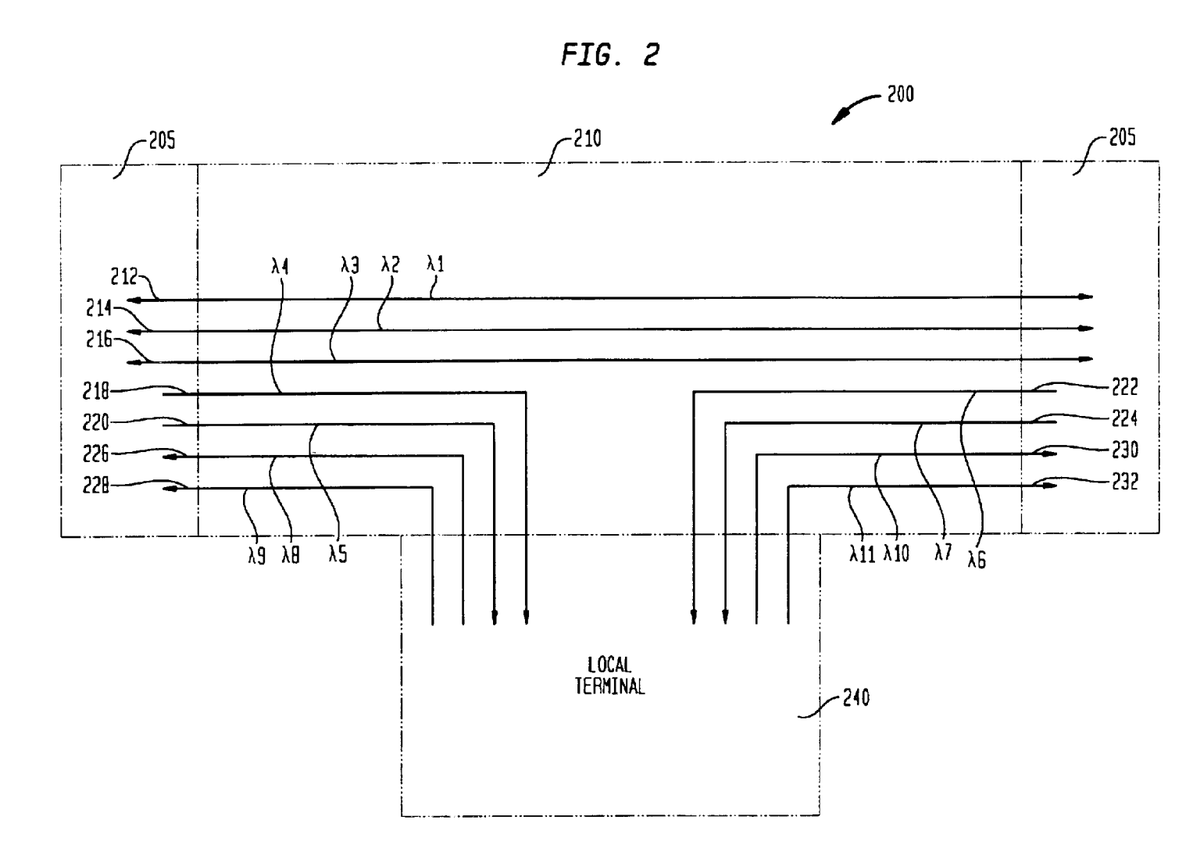
FIG. 2 illustrates an optical add-drop multiplexer (OADM) in accordance with the present invention.

FIG. 2 schematically shows the operation of an OADM node 200 that can be used to add selected mono-wavelength traffic onto and drop selected mono-wavelength traffic off an OLS 205 carrying bidirectional DWDM signals. In this figure, $\lambda_1$, $\lambda_2$, $\lambda_3$, $\lambda_4$, $\lambda_5$, $\lambda_6$, $\lambda_7$, $\lambda_8$, $\lambda_9$, $\lambda_{10}$ and $\lambda_{11}$ represent different signal wavelengths. OADM node 200 includes an OADM 210 which is interposed into OLS 205. OADM 210 facilitates bidirectional passage of some mono-wavelength signals from one portion of OLS 205 to the other portion. For example, mono-wavelength signals 212, 214 and 216 carried at $\lambda_1$, $\lambda_2$, and $\lambda_3$, respectively are permitted bidirectional unimpeded passage through OADM 210. This passage is permitted because the destinations for the signals being conveyed at these wavelengths at a given time happen to be elsewhere in the pathway of OLS 205.

OADM 210 also permits selected mono-wavelength traffic to be dropped off from OLS 205. For example, mono-wavelength signals 218, 220, 222 and 224 respectively carried at $\lambda_4$, $\lambda_5$, $\lambda_6$, and $\lambda_7$, are shown as being directed into local terminal 240. The destinations for signals 218, 220, 222 and 224 being conveyed at such wavelengths at a given time happen to be local to this portion of the pathway of OLS 205. The local traffic that is dropped from OLS 205 by OADM 210 can then be fed, for example, into a metropolitan area network, a synchronous optical network (SONET), or an Internet protocol (IP) network.

OADM 210 further permits selected mono-wavelength traffic to be added onto OLS 205, for example from a metropolitan area network, a SONET, or an IP network. For example, mono-wavelength signals 226, 228, 230 and 232 respectively carried at $\lambda_8$, $\lambda_9$, $\lambda_{10}$ and $\lambda_{11}$, are shown as being directed onto OLS 205 from local terminal 240. As previously explained, OLS systems carry bidirectional traffic. Here, signals 226 and 228 are directed into that portion of OLS 205 on the left side of FIG. 2 to be conducted in one direction on OLS 205. Signals 230 and 232 are directed into that portion of OLS 205 on the right side of FIG. 2 to be conducted in the other direction on OLS 205.

In sum, OADM 210 facilitates bidirectional passage of DWDM traffic, dropping of selected mono-wavelength traffic destined for local termination points where the OADM is located, and addition of mono-wavelength traffic destined to be directed in either direction on the OLS. However, OADM 210, in contrast to OXC 105, does not facilitate any switching of traffic from one pathway to another.

With the operational capabilities of OXCs and OADMs in mind, to develop systems and methods for the design of optimized mesh networks incorporating such components, it is necessary to facilitate both differentiation between the impacts of use of OXCs and OADMs at any given point in the mesh network, and optimization of the configuration and use at any given point of OXCs and OADMs. In this regard, it will be insufficient to simply place an OXC on every OLS location in a major metropolitan area where very large amounts of traffic are generated and terminated, and also where traffic from various regions needs to be switched to other regions. It will further be insufficient to simply place an OADM on every OLS location in a relatively small town where traffic generation and switching is typically on a much smaller scale compared to the metropolitan areas. Such measures lead to a network that is overprovisioned and underprovisioned at diverse locations. Furthermore, such simple protocols will be insufficient for determination of the optimum configuration of OXC or OADM capacity required at each network node.

Given a network design with V nodes, E right of ways, and T traffic demands with varying protection levels, it is thus advantageous to: (1) determine a cost optimal topology that contains a subset of right of ways from the set E, (2) determine the optimal placement of OXCs and OADMs at each node of the network design, and (3) optimally configure the system based on the routed traffic.

In developing a method to be applied to achieve such optimization, two main parameters characterize any traffic demand t within a succession T of traffic demands (t∈T): (1) protection status of t, and (2) signal type of t4, such as its transmission speed. For example, the traffic could either be entitled to dedicated failure protection, or to no such protection. Further, core optical networks typically support traffic at varied transmission speeds, such as, for example, 2.5 gigabits per second (G/s), 10 G/s or 40 G/s.

A suitable foundation for the network design system to be used in order to manage these basic parameters regarding any traffic demand t within a succession T of traffic demands is summarized below as System 1.

System 1:
Order traffic t, t∈T, in some initial random order.
For each traffic t, t∈T
    Select a technique to route traffic t, based on its failure protection type.
    Route traffic t to take the least cost available route p.
    Allocate resources for the route p.
    Update the total cost of the network, C.
While C is converging, (Note: network cost C converges to finality when the cost of routing all the demands in the new loop is the same as that of the previous loop.)
    For each traffic t, t∈T
        Unroute and free resources allocated for traffic t with route p.
        Select technique to route traffic t, based on its failure protection type.

Reroute traffic t on a new least cost route p'.
Allocate resources for the route p'.
Update the total cost of the network.
End.

Optical network design optimization has been shown in the literature to be extremely resistant to rigorous solution for a large scale mesh system, and therefore in computing parlance is described as being "NP-Hard." System 1 is an excellent heuristic to begin with in order to solve the network design problem. In implementing basic System 1, multiple systems could instead be used to route traffic with different protection levels.

The classic shortest path problem that is addressed by System 1 can be represented in a simplified mode by considering unprotected mesh network traffic. Given a schematic diagram of the links in such a mesh network having cost weighted edges and a specific pair of nodes corresponding to a particular traffic source and sink, one needs to find the cheapest path between the source and sink. In this network design problem, the edge weights are defined by the corresponding costs of resources needed to provision the edges along the route. Typically, this cost is the dollar cost of routing the traffic demands on the optical transmission system used on the edges. However, this application of Dijkstra's shortest path algorithm does not take into account the cost of the nodes themselves in routing the traffic demands. For example, two paths from source to sink could have the same total edge cost, but the first path could, for example, have more nodes in the path as compared to the second path. Thus, when the dollar cost of the nodes themselves is also taken into account, the second path could be the cheaper and preferred path. Background information on shortest path algorithms is provided in Introduction to Algorithms, Thomas Cormen et al, MIT Press, 1990, and Data Structures and Network Algorithms, Robert Endre Tarjan, SIAM, 1983 both of which are incorporated herein by reference in their entirety.

Figure 3:
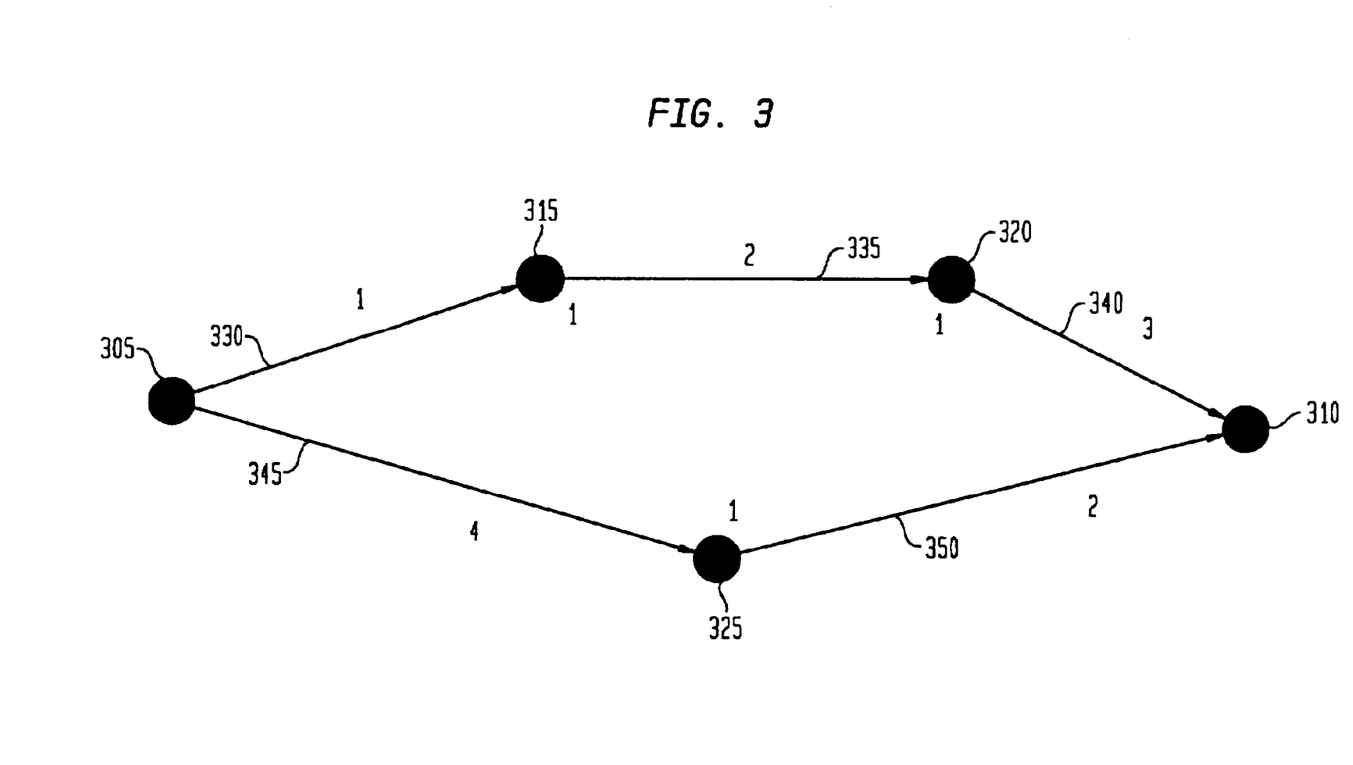
FIG. 3 illustrates an exemplary network illustrating node costs in relation to routing demands in accordance with the present invention.

A system for taking into account the cost of nodes in provisioning a mesh network design is illustrated in FIG. 3, which shows source node 305 and sink node 310. One path between source node 305 and sink node 310 passes through OLS nodes 315 and 320. The other path between source node 305 and sink node 310 passes through OLS node 325. Hypothetical relative costs of the node and links are marked next to nodes 305–325 and the links between them. For example, the hypothetical cost of node 315 is one. Source node 305 and sink node 310 are assumed to already be in place, because they are essential to transmission via either of the two possible paths and consequently have no cost assigned to them. The total marginal cost of sending traffic between source node 305 and sink node 310 through nodes 315 and 320 is equal to 1+1=2 units for nodes 315 and 320 plus 1+2+3=6 units for links 330, 335 and 340. Hence, the total cost of that routing is 2+6=8 units. On the other hand, the total cost of sending given traffic between source node 305 and sink node 310 through node 325 is 7 units. Accordingly, the route through node 325 is cheaper than the route through nodes 315 and 320.

Figure 4:
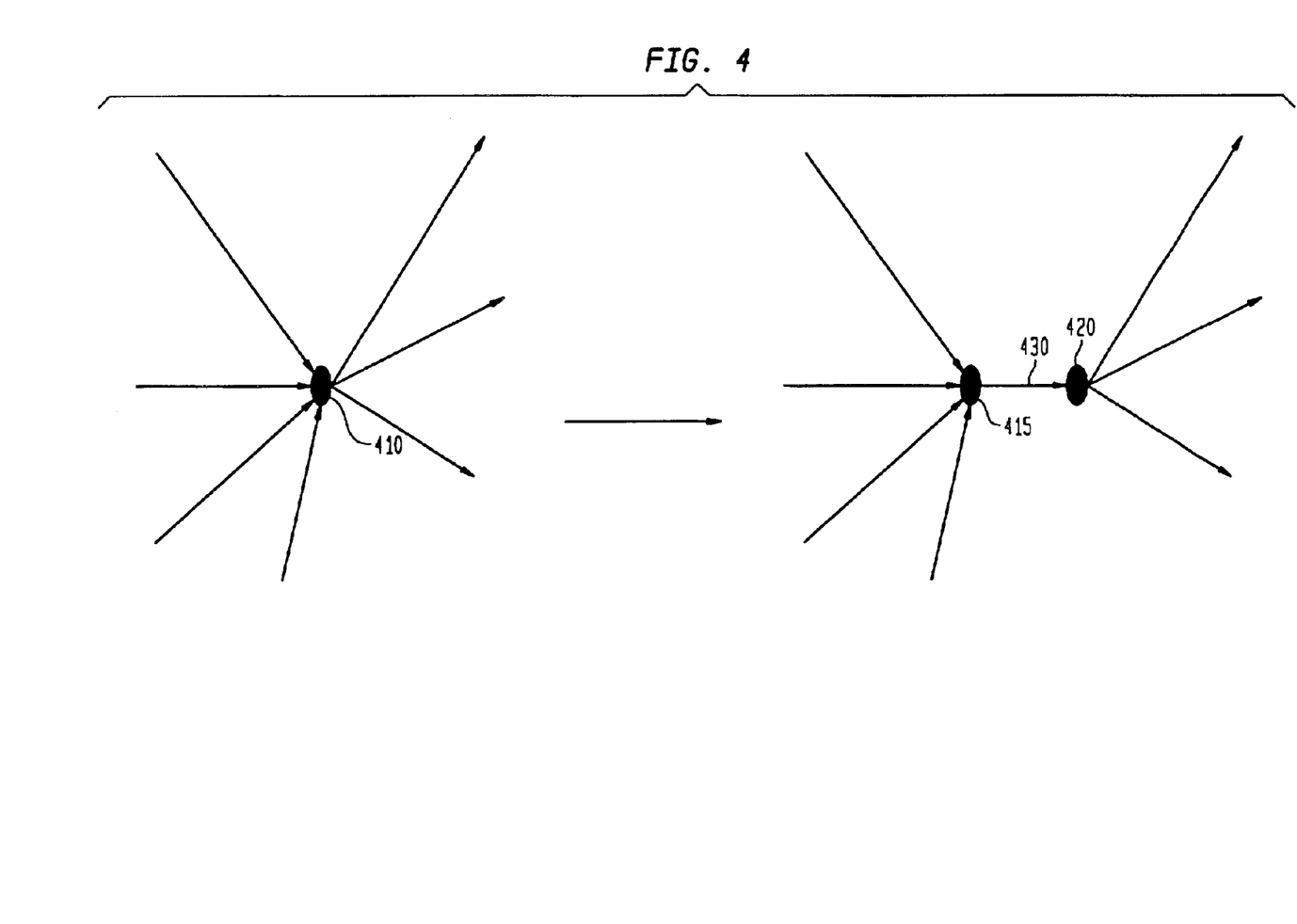
FIG. 4 illustrates an exemplary node transformation to include node cost in accordance with the present invention.

Dijkstra's shortest path algorithm takes only link costs into account. It does not evaluate node costs. Hence, a network design system based on the use of Dijkstra's algorithm cannot take node costs into account. In order to provide a diagram of multiple potential traffic pathways from source node to sink node that will allow a system that implements Dijkstra's algorithm to take node cost into account, the diagram in FIG. 3 can be transformed utilizing a transformation illustrated in FIG. 4. In this transformation, a node 410 is split into two nodes 415 and 420, with a pseudo link 430 connecting them. The cost of this newly added pseudo link would be defined as the cost of adding the original node 410, which is the dollar cost of the OXC or OADM located at that node.

In defining dedicated protection paths for traffic that is entitled to single failure protection, it is necessary to find two different node disjointed paths from the source node to the destination node. One of these paths will be the active traffic path, and the other will be the dedicated protection path. Stated otherwise, there must be two paths between the defined source and destination points that do not share any nodes. In order to find two such paths, it is necessary to determine a minimum cost two-flow design in a unit capacity network. Such a minimum cost two-flow design can be determined by a network design system that applies Dijkstra's algorithm twice on the network. Background information on such applications of Dijkstra's algorithm is provided in Disjoint Paths in a Network, J. W. Suurbaale, Networks (4) June, 1974, which is incorporated herein by reference in its entirety. The second invocation of Dijkstra's algorithm in such a system is carried out on a transformed network design is further, as described in Disjoint Paths in a Network. To define two node disjointed paths, each node is split into a node and a pseudo-node. In this transformed network design, node disjointed paths permit determination of edge disjointed paths. The purpose for creating the pseudo-nodes is to simultaneously create pseudo-links. Dijkstra's algorithm can take the latter into account, but not the former. Since this concept of the split node is conventionally implemented in addressing such disjointed paths in a network, Dijkstra's algorithm can be implemented in a system to thus take the node costs into account while routing traffic entitled to dedicated protection.

However, none of the above systems are suitable in their forms as thus far discussed, to determine the placement and configuration of OXCs and OADMs on a mesh network design. They require modifications in accordance with the present invention, as are further discussed below. In particular, systems that conventionally implement Dijkstra's algorithm are unable to take into account the degree of a node, which effectively amounts to taking into account the correct dollar cost of either an OXC or an OADM while routing the demands.

Figure 5:
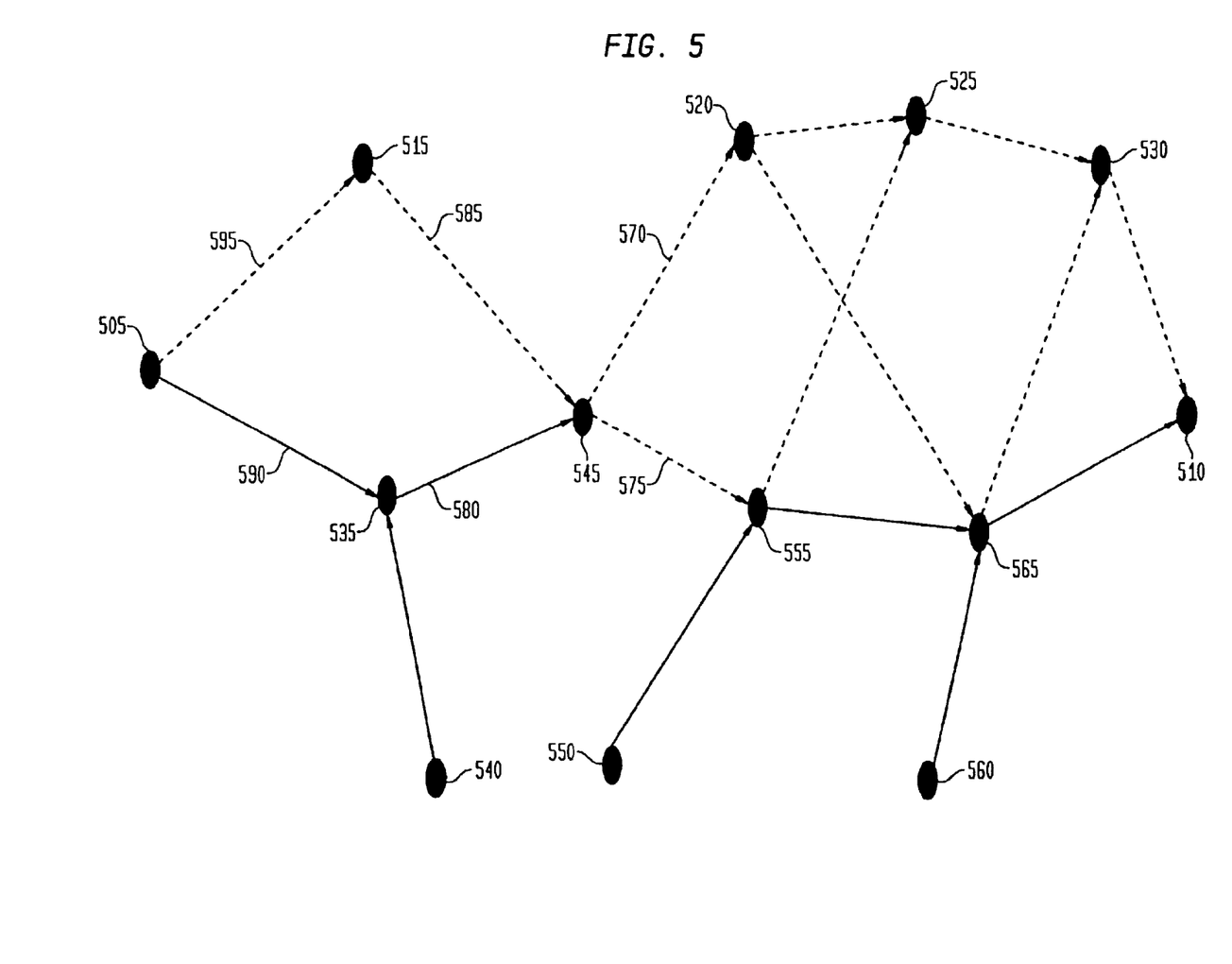
FIG. 5 illustrates an exemplary network in accordance with another aspect of the present invention.

For example, FIG. 5 schematically illustrates a mesh network design implementing Dijkstra's algorithm in which several traffic demands have been routed, as shown by solid lines. Assume a new demand not entitled to failure protection, originating at node 505 and terminating at node 510, needs to be routed by a system for traffic path design implementing Dijkstra's algorithm on the data represented by FIG. 5. The dashed lines in FIG. 5 indicate that the right-of-ways passing through nodes 515, 520, 525 and 530 are not yet being used to route any traffic demand. Additional nodes 535, 540, 545, 550, 555, 560 and 565 are also shown. As can been seen in FIG. 5, the route for the new traffic demand between nodes 505 and 510 definitely must pass through node 545. However, until the system design configuration is completed, one cannot predict whether the chosen path will use edge 570 between nodes 545 and 520, or edge 575 between nodes 545 and 555 in its final path. Similarly, one cannot predict whether the chosen path will use edge 580 between nodes 535 and 545 or edge 585 between nodes 515 and 545 in the path. This uncertainty is because according to Dijkstra's algorithm, one constructs the final path by tracking the predecessor of each node, starting from the destination node, once the destination has been reached.

An OXC is required to be placed at any node where a switching decision is required, because OADMs cannot execute switching. It can be assumed that network traffic in one unswitched direction on an OLS constitutes a "degree." Two way traffic on an OLS constitutes two degrees. Traffic switched among two links in one direction also constitutes two degrees. Given a node with three adjacent edges A, B and C, an input at A has to be switched to either B or C and thus a switching decision is required. Hence, any node with a degree greater than or equal to three requires an OXC, because OADMs do not perform switching. An OADM is placed at all the other nodes, where traffic originates or terminates and the degree of the node is less than three. At such nodes traffic is limited to pass-through signals and local activity involving the adding or dropping of a signal.

Referring to FIG. 5, if the path for the new traffic contains node 515, then an OXC will be required to be placed at node 545, as both edges 580 and 585 will be in use and therefore the degree of node 545 will be at least three assuming that at least one among edges 570 and 575 will also be in the path. However, if node 535 is in the final path for the new traffic, then node 545 requires only an OADM as its degree will still be two assuming that only one among edges 570 and 575 will also be in the path. When Dijkstra's algorithm is used on the FIG. 5 data by the design system to evaluate the cost of reaching node 520 or 555 from node 505, the path from node 505 with which it has reached node 520 or 555 respectively is unknown. That portion of the path will only be determined after the full path has been computed. Thus, computation of the cheapest path by applying Dijkstra's algorithm to FIG. 5 is not possible.

FIG. 5 further shows some demands to have already been routed on edges 590 and 580. Therefore, equipment has already been provisioned to satisfy those traffic demands. Based on assessment of immediate needs, the demand from node 505 to node 510 accordingly is very likely to take the path through nodes 505, 535, 545, 555, 565, and 510, as the cost of adding one extra demand to these already operational nodes while retaining an OADM at node 545, is much less than the cost of using a completely new right of way such as edges 595 and 585. If, alternatively, the chosen route passed through node 515, then node 545 would have to be provisioned with a higher cost OXC instead of a cheaper OADM. However, if high projected future demands through edges 595 and 585 could be taken into account, the system operator would perhaps have benefited from installing such an OXC by obtaining a lower cost network design over the equipment lifetimes. Computation of the cheapest path over such equipment lifetimes by applying Dijkstra's algorithm to FIG. 5 is not possible.

One simple approach that has been used in an effort to better optimize a mesh network design through iterative application of Dijkstra's algorithm to data such as that provided in FIG. 5, entails doing a post process analysis of the completed network once all traffic demands have been routed. Under this approach, OXCs are retained in all nodes with a degree greater than or equal to three, and OADMs are employed in the other nodes that have a degree less than three. This approach is consistent with conventional applications of Dijkstra's algorithm, whereby OXCs are initially placed at nodes and later downgraded to OADMs if the design system so dictates. Such a technique is suboptimal, as the routing decisions regarding still unrouted demands heavily depend on the routing decisions already made as the post-process proceeds. Such a simple approach can certainly be used to evaluate all possible network design configurations in a system having a small number of nodes and links.

However, in a large scale network having tens of thousands of nodes and links, the possible permutations in system design are of a staggering magnitude. In such a network, this tedious approach is not only costly, but perhaps impossible to practically implement even with currently available computing power.

According to the present invention, systems and methods are provided, implementing Dijkstra's algorithm with data modified in a manner to now be described, that are suitable to determine the placement and configuration of OXCs and OADMs on a mesh network design.

Figure 6:
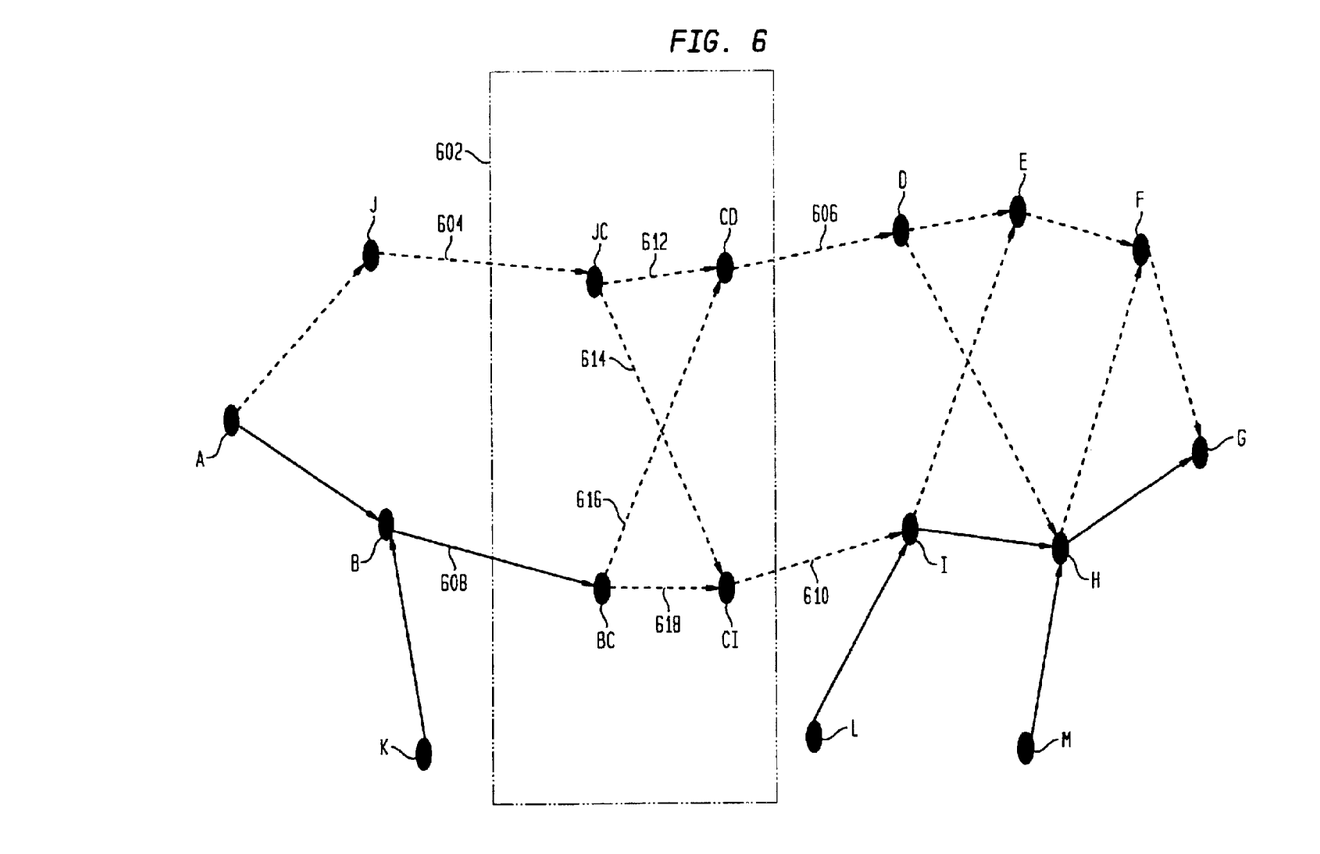
FIG. 6 illustrates a network showing node transformation to indicate the degree of a node in accordance with the present invention.

More particularly, FIG. 6 illustrates a transformation of the data represented in FIG. 5 that can be undertaken in accordance with the present invention which enables a network design system implementing Dijkstra's algorithm to take into account the degree of the nodes and thus to define optimal placements and configurations of OXCs and OADMs. FIG. 6 shows such a transformation only for one exemplary node 602, which as transformed will be referred to by the designation C and corresponds to node 545 in FIG. 5. Node 602 includes edges connecting it to four other nodes, B, D, I and J. Also illustrated are nodes A, E, F, G, H, K, L and M. Node 602 has been transformed by adding to it pseudo-nodes JC, CD, BC and CI. Pseudo-node JC emulates the edge 604 between node J and node C. Pseudo-node CD emulates the edge 606 between node C and node D. Pseudo-node BC emulates the edge 608 between node B and node C. Pseudo-node CI emulates the edge 610 between node C and node I. However, substitution of node C by pseudo-nodes JC, CD, BC and CI also creates pseudo-edges 612, 614, 616 and 618. These pseudo-edges respectively connect pseudo-nodes JC with CD, JC with CI, BC with CD, and BC with CI. These four connections are representative of four possible degrees for node C. Hence, as illustrated in FIG. 6, node C has been transformed to simultaneously (1) preserve the representation of edges 604, 606, 608 and 610, and (2) represent four possible degrees of node C by pseudo-edges 612, 614, 616 and 618. Since the degrees of node C have been transformed into pseudo-edges, Dijkstra's algorithm, which considers only edges and cannot address nodes, can now be applied to determine whether provisioning node C with an OADM will suffice, or alternatively that an OXC is required.

The same transformation discussed above with reference to node C is then applied to all of the other nodes A, B, and D–M shown in the network design of FIG. 6. Once the first traffic demand $t_1$, $t_1 \in T$, is routed on the network, its path is known. At this point since no other demand has been routed, no node needs an OXC. Next an OADM is introduced for each node in the first traffic demand's path, since at each node eventually there will at least be either originating or terminating traffic. During the routing of the second demand and the demands that follow, there is a chance that the degree of a node will become greater than two as explained earlier, requiring substitution of an OXC for the OADM. Next, the network data transformation as illustrated in FIG. 6 is applied to the successive routing of the remaining traffic demands.

This network design process can be further illustrated for two exemplary simultaneous traffic demands, while also making additional provisions for bidirectional traffic. For a given node i, if there are j nodes incident on node i with edges connecting the j nodes and node i, and k nodes directed away from node i with edges connecting the k nodes and node i, a traffic path can only go through node i by one of the j times k ways. All of these possibilities are then evaluated at each node by transforming the network design accordingly and then determining the optimal placement of either an OADM or an optimal size OXC.

In such an embodiment according to the present invention, a node $V_i$ is provided, having j edges constituting right of ways incident onto it and k edges directed away from it. Such bidirectional representation is normally required, since one way traffic constitutes a nodal degree. The j nodes $C_1, \ldots, C_j$ form j edges incident onto node $V_i$. Similarly, the k nodes $D_i, \ldots, D_k$ form k edges from node $V_i$, directed away from it. Then, j+k pseudo-nodes are introduced for transformation of the node $V_i$, in the same manner shown for node C in FIG. 6. The j pseudo-nodes are named as Cx Vi, in which x ranges in value from 1 to j (alternatively expressed as: x∈(1,j)), and the k pseudo-nodes are named as Dy Vi, y∈(1,k). The edge between a node Cx and the node Vi in the original network design is now the edge between node Cx and pseudo-node Cx Vi in the transformed network design. Similarly, the edge between node Dy and node Vi in the original network design is now the edge between node Dy and pseudo-node Dy Vi in the transformed network design.

Next, pseudo-edges are added connecting each pseudo-node $C_xV_i$ with each pseudo-node $D_yV_i$, y∈(1..., k) and this addition is repeated for each X=1, ..., j. Thus, in total an additional j times k pseudo-edges are added connecting all the j pseudo-nodes with each of the k pseudo-nodes. Referring back to FIG. 6, it can be seen that this process is the same transformation process as was applied there to node C. The cost of a pseudo-edge between pseudo-node $C_xV_i$ and pseudo-node $D_yV_i$ is the cost that would be incurred if the final route has the pseudo-edges $C_x$–$V_i$ and $V_i$–$D_y$ in its path. If the node $V_i$ already has an OXC, this transformation can be used to determine the optimal number of ports needed in the OXC. If the current degree of the node is two and an OADM is present on this node, it is necessary to determine if routing the new demand will require an OXC to be placed at this node instead of an OADM. Assuming that an OADM exists on node Vi and is along the path ..., $C_\alpha$, $V_i$, $D_\beta$, ..., then if a new demand is routed along this path, upgrading the OADM to an OXC will not be necessary. Instead, more channel capacity will be added to the OADM in this path. Use of any other pseudo-edge in the j times k edges would require replacement of the OADM by an OXC, as the degree of the node $V_i$ would be increased to more than two. If the transformation requires adding more channel capacity, then the cost is the price of adding more channels to the OADM. If the transformation requires upgrading an OADM to an OXC, then the cost is the price of an OXC with adequate ports and correct switch size. During the addition of the new edges in the transformed representation of the network, the cost of each node can be pre-computed and this cost can be applied when exploring the shortest path by a network design system implementing Dijkstra's algorithm. Once the final path for the traffic has been computed on this transformed network design, the pseudo-edge from among the j times k pseudo-edges that is part of the path is known. The equipment on this pseudo-edge is the equipment at node $V_i$ after routing the now existing demands. Before routing a new demand, a new transformed network design is constructed by duplicating the state of node $V_i$ in the newly created j times k pseudo-edges.

In other words, a network design transformation technique in accordance with the present invention first considers all the edges, or light paths, that are incident, or in-coming, on a network node. A pseudo-node is created for each of edges incident on this node. Each of the edges that were all incident on the original node are connected, one each, to each of the newly constructed pseudo-nodes. At this point, each edge that was incident on the original node is now incident on just one of the newly created pseudo-nodes. Next, all of the edges that were outgoing from the original node to various other nodes are considered. For each such outgoing edge, a pseudo-node is created. For each outgoing edge from the original node to different destinations, one of the pseudo-nodes is connected with the same destination node as in the original network design.

At this point, the transformed network design has as many pseudo-nodes as the in-coming edges on the original node, plus as many pseudo-nodes as the outgoing edges from the original node. The edges originally incident on the single node are now each individually incident, one each, on the pseudo-nodes. Similarly, the edges originally outgoing from the single node to different destination nodes now originate, one each, from the pseudo-nodes and connect to their destination nodes as in the original graph. Finally, from each of the pseudo-nodes created for each incident link on the node, add a pseudo-edge to every pseudo-node that was created in lieu of each of the outgoing edges from the node. This technique is then repeated for each node of the network.

Take, for example, a network node which has five incoming edges and eight outgoing edges. The transformed graph would have five pseudo-nodes for each of the incoming edges and eight pseudo-nodes for the outgoing edges. Each of the incoming edges will now be incident one each on the five pseudo-nodes and similarly, the outgoing edges now originate from one of the eight pseudo-nodes. Each of the five pseudo-nodes is connected to all the eight pseudo-nodes, adding a total of 5*8=40 pseudo-edges.

In one aspect of the present invention, a network design transformation can be used to select equipment that has been cost optimized for each degree of a node. Further, the network design transformation techniques of the present invention can also be used to route demands such that, in the resulting network design, any given node will not have a degree of more than a desired number by appropriately pre-computing the cost of each of the j*k pseudo-edges that have been added as part of the network design transformation. For example, assume that for each degree of a node there an cost optimal equipment that can be used, and that for all nodes with degree 2 it is cost optimal to use an OADM, for nodes with degree 3 it is cost optimal to a 3-OADM and similarly for all nodes with degree M it is cost optimal to use M-OADM. An M-OADM is optimized to support a node of degree M. For all nodes with degree greater than M it is cost optimal to use an OXC. In such a context, when we pre-compute the cost of each of the pseudo-edges, we would know the degree of the node that would be formed if this particular pseudo-edge is part of the final route. Hence, the cost of the pseudo-edge is the cost of equipment needed to support the required channels on the equipment that is cost optimal for that degree of the node.

Similarly, when routing demands such that no node in the final network design has more than a specified degree, the appropriate costs should be assigned to the pseudo-edges. When assigning costs to a pseudo-edge, the final degree of the node is known if the pseudo-edge would be part of the final shortest path. If this final degree happens to exceed the specified upper bound on the degree of the node, then the pre-computed cost of the pseudo-edge would be set to a large number, such as infinity. This assignment of cost guarantees that a path comprising this pseudo-edge will never be the shortest path as this edge has an very high, or infinite, cost. Hence, while routing the demands, the present invention insures that no node will exceed the specified upper bound on the degree of the node.

If a network design does not have directed pairs of pseudo-edges each representing transmission in opposite one-way directions, then a transformation is applied to convert the undirected pseudo-edges in the network design to directed pseudo-edges. For each undirected pseudo-edge, two directed pseudo-edges are introduced, one in each of the two opposite directions. For each node, i, two nodes, $i_s$ and $i_d$, are introduced. Also a pseudo-edge directed from $i_s$ to node $i_d$ is introduced, so that Dijkstra's algorithm can recognize this transformation of the network design. If there also are existing directed pseudo edges in the network design, then incoming directed pseudo-edges are incident on node $i_s$ and any existing pseudo-edges that are directed away, originate from node $i_d$. Once a directed network design of the pseudo-edges is formed, the transformations described above can be used to handle the placement of OXCs and OADMs in the network design.

Figure 7:
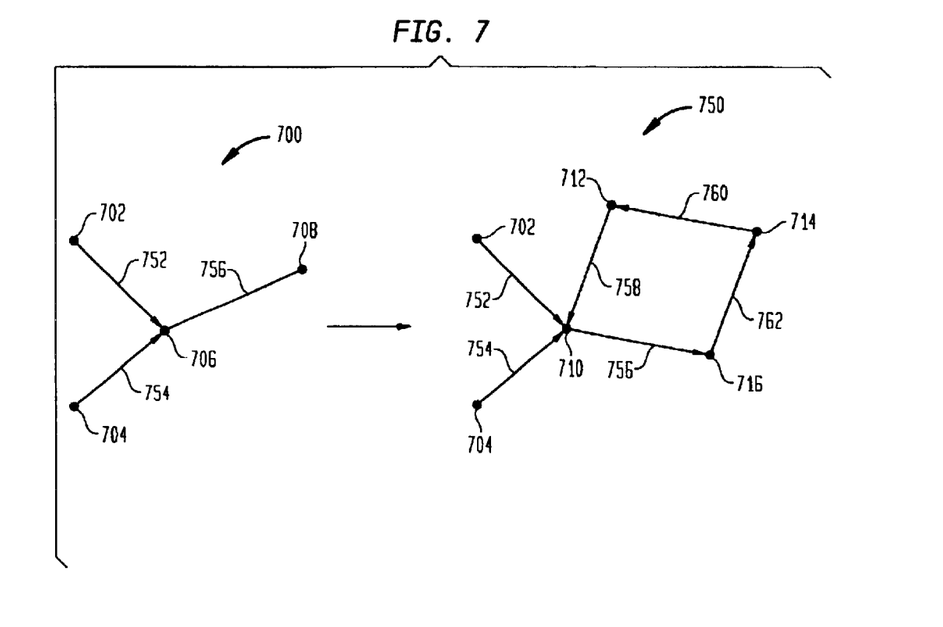
FIG. 7 illustrates a transformation of a network comprising undirected edges into a network comprising directed edges in accordance with the present invention.

See, for example, as shown in FIG. 7, the transformation of network 700 which includes an undirected edge into network 750 which does not include any undirected edges. Node 706 has two directed edges 752 and 754 incident on it from nodes 702 and 704, respectively, and a undirected edge 756 incident on it from node 708. To transform network 700 into network 750, the undirected edge 756 must be converted into directed edges. In the transformed network 750, the node 706 is represented by nodes 710 and 716, and the node 708 is represented by nodes 712 and 714. Directed pseudo-edge 756 connects nodes 710 and 716, and directed pseudo-edge 760 connects nodes 712 and 714. The undirected edge 756 is transformed into directed edges 758 and 762, with edge 758 connecting nodes 710 and 712, and edge 762 connecting nodes 716 and 714.

While determining the cost of a new OXC to be placed on a pseudo-edge, the commercially-available choices for OXC capacities can also be evaluated. For example, OXCs may have varying switching fabric sizes such as: 6 times 6, 64 times 64, 256 times 256, 1024 times 1024, or some other size. A given network design need is then evaluated to establish which among available OXC capacities satisfy the port capacity needed, and also which one is the cheapest from among those available.

In addition to determining the appropriate switch size for a given OXC on a node, it is also desirable to determine the optimal number of ports to be provided on a given OXC. In one embodiment according to the present invention, a node is provisioned with an OXC configured with a specified number of ports, reflecting the current needs present in the operating network. This node thus represents a capacitated network onto which new traffic demands will have to be added and network design updates must accordingly be performed on an ongoing basis. The number of ports on the OXC connected to each edge that is connected to the node is known. Each particular port that is connected to the edge can only be used to route demands whose final route contains that particular edge and the node.

If Dijkstra's algorithm is applied to the network design as illustrated above in connection with FIG. 5, the use of these ports cannot effectively be evaluated, as during the routing process one would not know which edge would be part of the final route. Such an application of Dijkstra's algorithm would overestimate the cost of routing on this node by estimating that cost to be the cost of configuring twice the number of ports as that of the traffic demand being routed, to reflect both inputs and outputs. If there was another path p', whose cost was less than the cost of the over estimated path cost, but in reality higher than the true cheapest cost path, the path p' would incorrectly be selected.

With the transformation in FIG. 6 and the directional transformation also discussed above, one would know the exact sub-path containing that particular node and would be able to make use of all the ports connected to that particular edge. Thus, optimal port configuration of the OXC can also be determined.

The transformations to System 1 described above yield optimal results in terms of placement of OADMs and OXCs, and also regarding determination of the optimal switch size and port count of OXCs. Such optimization is applicable both to "green field" networks that are purely in the planning stage, and existing "capacitated" networks. Optimization of the selection of OADMs versus OXCs directly follows from the fact that the transformation described in regard to FIG. 6 above permits evaluation of all possible network configurations. Such optimizations can be used to greatly reduce overall network cost by using OADMs as much as possible in a mesh network instead of OXCs, which are substantially more expensive.

Figure 8A:
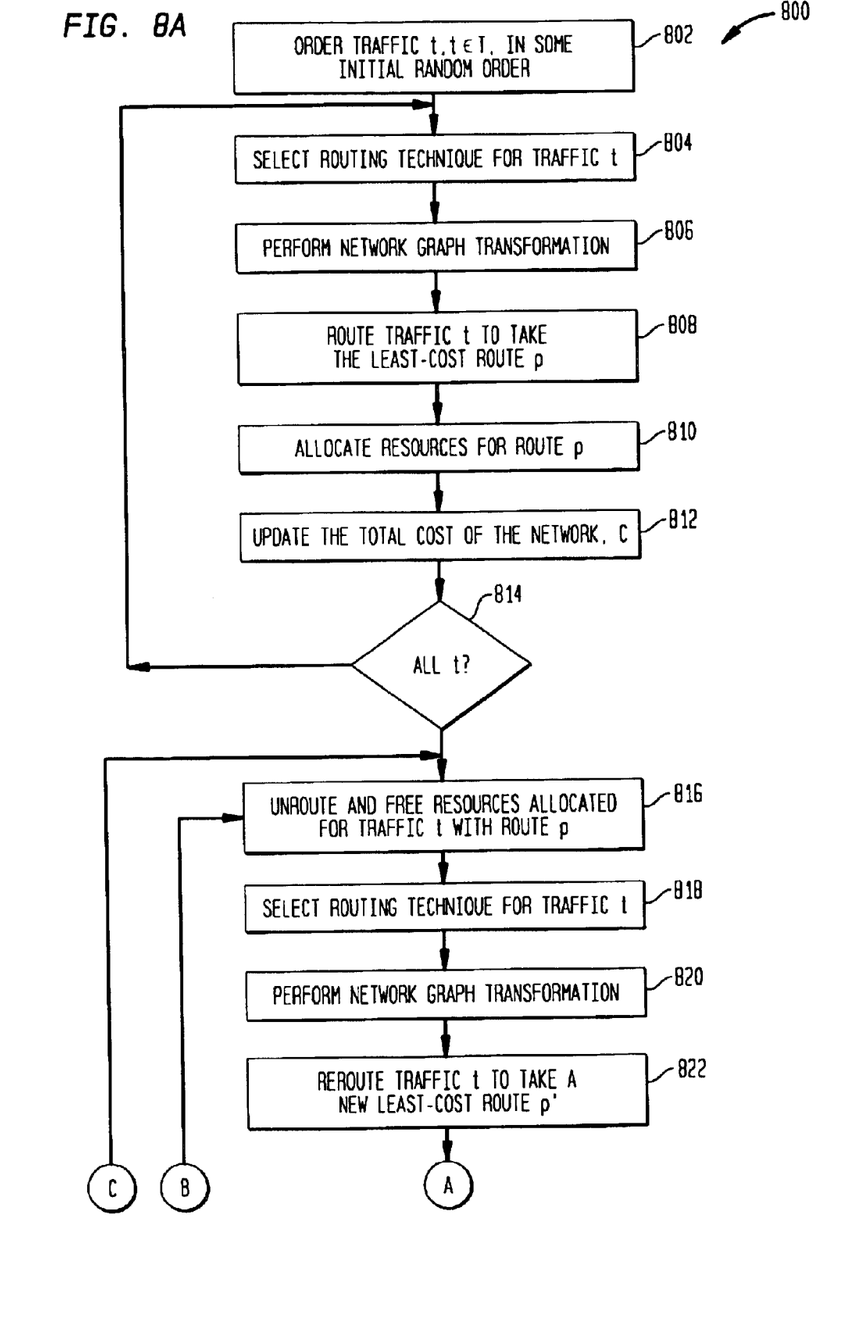
FIGS. 8A and 8B illustrate a method of network design in accordance with the present invention.
Figure 8B:
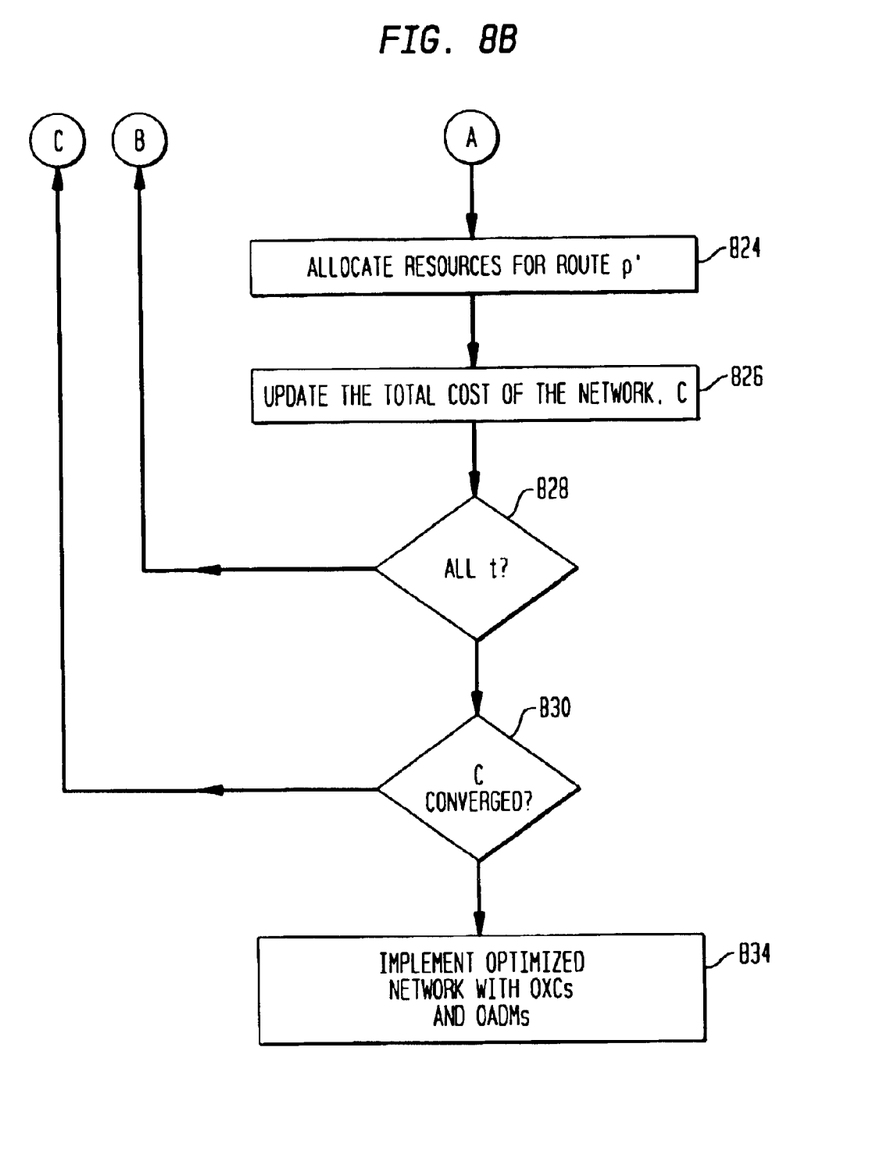

FIGS. 8A and 8B show a method 800 of network design in accordance with the present invention. In step 802, all the traffic t, t∈T, to be carried by a network is placed in an initial random order. Next, steps 804–812 are repeated for each traffic t, t∈T. In step 804, a routing technique is determined for traffic t based on the traffic's failure protection type. For example, Dijkstra's shortest path algorithm may be utilized. In step 806, a network graph transformation is performed for each node in the network. This network graph transformation operates as described for exemplary node 545 in relation to FIGS. 5 and 6 described above. In step 808, traffic t is routed to take the least-cost available route p. In step 810, resources are allocated for the route p to determine the node degree for each node and determine if an OXC or an OADM should be placed at each node based on the node degree. In step 812, the total cost of the network, C, is updated based on the equipment to be deployed at each node and routes allocated through the network. In step 814, it is determined if all t have been routed. If all t have not been routed, the method returns to step 804 and continues with the next t. If all t have been routed, the method continues to step 816.

Steps 816–826 are repeated for each traffic t, t∈T. In step 816, for traffic t with route p, the route is unrouted and allocated resources are freed. In step 818, a routing technique is determined for traffic t based on the traffic's failure protection type. In step 820, a network graph transformation is performed for each node in the network. This network graph transformation operates as described for exemplary node 545 in relation to FIGS. 5 and 6 described above. In step 822, traffic t is rerouted on a new least cost route p'. In step 824, resources are allocated for the route p' to determine the node degree for each node and determine if an OXC or an OADM should be placed at each node based on the node degree. Additionally, the port capacity and switch size for each OXC can be determined. In step 826, the total cost of the network, C, is updated based on the equipment to be deployed at each node and routes allocated through the network. In step 828, it is determined if all t have been rerouted If all t have not been re-routed, the method returns to step 816 and continues with the next t. If all t have been routed, the method continues to step 830. In step 830, it is determined if the network cost C has converged. The network cost C converges when the cost of routing all the traffic demands in the new pass through steps 816–826 is the same as that of the previous pass through steps 816–826. If C has not converged, the method continues to step 816 and begins processing for all t. If C has converged, the method continues to step 832. In step 832, the network is implemented with OXCs and OADMs at the appropriate nodes as previously determined.

While the present invention is disclosed in the context of a presently preferred embodiment, it will be recognized that a wide variety of implementations may be employed by persons of ordinary skill in the art consistent with the above discussion and the claims which follow below.

What is claimed is:

1. A network design method for an optical network comprising:

determining a network graph of the network comprising nodes and paths connecting the nodes;

performing a transformation on the network graph, said transformation replacing a node with an incoming pseudo-node for each incoming path to the node, an outgoing pseudo-node for each outgoing path from the node, and pseudo-edges connecting each incoming pseudo-node to every outgoing pseudo-node;

assigning pseudo-edge costs to the pseudo-edges based on a node cost;

performing a routing analysis, using at least one of the assigned pseudo-edge costs, to route a plurality of traffic demands through the transformed network graph; and determining a type of network equipment to be placed at the node.

2. The network design method of claim 1 further comprising the steps of:

performing the transformation for each node of the network; and providing the type of network equipment to be placed at each node of the network.

3. The network design method of claim 1 further wherein the step of determining the type of network equipment comprises the substep of: determining the degree of the node.

4. The network design method of claim 3 wherein the degree of the node is based on the number of incoming paths and outgoing paths carrying traffic.

5. The network design method of claim 4 wherein:

the type of network equipment is an optical add-drop multiplexer (OADM) if the degree of the node is not greater than two; and the type of network equipment is an optical cross connect (OXC) if the degree of the node is greater than two.

6. The network design method of claim 5 further comprising the step of:

determining the switch size of the OXC, if an OXC is to be placed at the node.

7. The network design method of claim 6 further comprising the step of:

determining the number of ports of the OXC, if an OXC is to be placed at the node.

8. The network design method of claim 4 wherein the type of network equipment is an M optical add-drop multiplexer (M-OADM) if the degree of the node is M.

9. The network design method of claim 4 further comprising the step of:

assigning a maximum possible degree to the node.

10. The network design method of claim 1 wherein the routing analysis utilizes Dijkstra's algorithm.

11. The method of claim 10 further wherein the step of determining an optimal type of network equipment comprises the substep of:

determining the degree of the node.

12. The method of claim 11 wherein the degree of the node is based on the number of incoming paths and outgoing paths carrying traffic.

13. The method of claim 12 wherein the type of network equipment is an M optical add-drop multiplexer (M-OADM) if the degree of the node is M.

14. The method of claim 12 further comprising the step of:

assigning a maximum possible degree to the node.

15. The method of claim 12 wherein:

the optimal type of network equipment is an optical add-drop multiplexer (OADM) if the degree of the node is not greater than two; and the optimal type of network equipment is an optical cross connect (OXC) if the degree of the node is greater than two.

16. The method of claim 15 further comprising the step of:

determining the switch size of the OXC, if an OXC is to be placed at the node.

17. The method of claim 15 further comprising the step of:

determining the number of ports of the OXC, if an OXC is to be placed at the node.

18. The network design method of claim 1 wherein the routing analysis determines the least cost route for traffic.

19. A method for optimizing an existing network comprising:

determining a network graph of the network comprising nodes and paths connecting the nodes;

performing a transformation on the network graph, said transformation replacing a node with an incoming pseudo-node for each incoming path to the node, an outgoing pseudo-node for each outgoing path from the node, and pseudo-edges connecting each incoming pseudo-node to every outgoing pseudo-node;

assigning pseudo-edge costs to the pseudo-edges based on a node cost;

performing a routing analysis, using at least one of the assigned pseudo-edge costs, to route a plurality of traffic demands through the transformed network graph;

determining an optimal type of network equipment to be placed at the node; and determining if the network node currently comprises the optimal type of network equipment;

providing the optimal type of network equipment to be placed at the node, if the network node does not comprise the optimal type of network equipment.

20. The method of claim 19 further comprising the steps of:

performing the transformation for each node of the network; and determining an optimal type of network equipment for each node of the network.

21. The method of claim 19 wherein the routing analysis utilizes Dijkstra's algorithm.

22. The method of claim 19 wherein the routing analysis determines the least cost route for traffic.

23. An optical network created by the following steps:

determining a network graph of the network comprising nodes and paths connecting the nodes;

performing a transformation on the network graph, said transformation replacing a node with an incoming pseudo-node for each incoming path to the node, an outgoing pseudo-node for each outgoing path from the node, and pseudo-edges connecting each incoming pseudo-node to every outgoing pseudo-node;

assigning pseudo-edge costs to the pseudo-edges based on a node cost;

performing a routing analysis, using at least one of the assigned pseudo-edge costs, to route a plurality of traffic demands through the transformed network graph; and determining a type of network equipment to be placed at the node based on the routing analysis.

* * * * *